(12) United States Patent
Graham et al.

(10) Patent No.: US 8,899,937 B2
(45) Date of Patent: Dec. 2, 2014

(54) EXCESSIVE WIND PORTAL FOR WIND TURBINES

(75) Inventors: John F. Graham, Austin, TX (US); Jonathan A. Paden, Austin, TX (US)

(73) Assignee: Building Turbines, Inc., Austin, TX (US)

( * ) Notice: Subject to any disclaimer, the term of this patent is extended or adjusted under 35 U.S.C. 154(b) by 655 days.

(21) Appl. No.: 13/179,718

(22) Filed: Jul. 11, 2011

(65) Prior Publication Data
US 2013/0017083 A1    Jan. 17, 2013

(51) Int. Cl.
F03D 3/00    (2006.01)
F03D 7/02    (2006.01)
F03D 3/06    (2006.01)

(52) U.S. Cl.
CPC .......... F03D 7/0268 (2013.01); F03D 7/0236 (2013.01); Y02E 10/74 (2013.01); F03D 3/061 (2013.01); F05B 2240/313 (2013.01); F05B 2240/213 (2013.01); F03D 7/0232 (2013.01)
USPC ................. 416/231 R; 416/197 A; 416/230; 290/55

(58) Field of Classification Search
USPC ........... 290/44, 45; 416/132 A, 132 B, 146 R, 416/197 A, 230, 231 R, 91
See application file for complete search history.

(56) References Cited

U.S. PATENT DOCUMENTS

| | | | |
|---|---|---|---|
| 387,102 A * | 7/1888 | Nagel | 416/91 |
| 752,764 A * | 2/1904 | Dunne | 417/35 |
| 4,218,183 A * | 8/1980 | Dall-Winther | 416/41 |
| 4,365,935 A * | 12/1982 | Zukeran | 416/117 |
| 4,566,853 A * | 1/1986 | Likitanupak | 416/117 |
| 5,732,642 A * | 3/1998 | DeSilva | 114/102.13 |
| 6,853,096 B1* | 2/2005 | Yu et al. | 290/55 |
| 7,258,527 B2* | 8/2007 | Shih | 416/17 |
| 7,696,635 B2* | 4/2010 | Boone | 290/55 |
| 7,918,648 B1* | 4/2011 | Simnacher | 416/111 |
| 7,946,802 B1* | 5/2011 | Iskrenovic | 415/4.2 |
| 8,087,894 B2* | 1/2012 | Brooks | 416/117 |
| 8,164,210 B2* | 4/2012 | Boone et al. | 290/55 |
| 8,177,481 B2* | 5/2012 | Liang | 415/4.2 |
| 8,523,522 B1* | 9/2013 | Vanderhye | 416/61 |
| 2008/0217924 A1* | 9/2008 | Boone | 290/55 |
| 2009/0180880 A1* | 7/2009 | Ersoy | 416/132 R |
| 2009/0185905 A1* | 7/2009 | Farb | 416/131 |
| 2013/0017083 A1* | 1/2013 | Graham et al. | 416/1 |

FOREIGN PATENT DOCUMENTS

| | | | |
|---|---|---|---|
| CN | 101509463 A | * | 8/2009 |
| JP | 09060573 A | * | 3/1997 |
| WO | WO 2008002149 A1 | * | 1/2008 |

\* cited by examiner

*Primary Examiner* — Edward Look
*Assistant Examiner* — Christopher R Legendre
(74) *Attorney, Agent, or Firm* — Law Offices of Mark L. Berrier

(57) ABSTRACT

Systems and methods for reducing wind pressure on wind turbine blades by selectively opening excessive wind portals in the turbine blades. One embodiment comprises a wind turbine system in which each of the turbine's blades has a portal therethrough that is opened or closed by a movable panel. Each panel is connected on one edge to the corresponding blade at the edge of the portal. Hook-and-loop material (Velcro) is attached to the edges of each portal and panel, allowing the panels to alternately open and then close the portals over a series of high wind events. Excessive wind pressure forces the panels to be released, opening the portals. Gravity or reversed wind direction with respect to the blade can be used to reseal the panels.

7 Claims, 5 Drawing Sheets

EXCESSIVE WIND PORTAL FOR WIND TURBINES

BACKGROUND

1. Field of the Invention

The invention relates generally to wind turbines, and more particularly to systems and methods for reducing wind pressure on wind turbine blades by selectively opening excessive wind portals in the turbine blades.

2. Related Art

Wind turbines of many types have been used to generate electricity. These turbines for generating electricity take many forms including the following:

Traditional-looking windmills operate with fan-like rotors that look like airplane propellers that face into or away from the wind. This type of turbine is one of the most common turbine configurations used today.

The Darrieus Turbine which looks roughly cylindrical, with wind-catching blades that span the length of the cylinder often described as looking like an egg beater. This vertical axis turbine has vertical blades that rotate into and out of the wind, the blades are placed roughly parallel in an arc to the axis. Guy cables are usually used to keep the turbine erect. In addition to keeping the turbine erect, the cables impose a large thrust loading on the main turbine bearings, causing increased wear on the bearings. With this type of turbine, replacing main bearings requires that the turbine be taken down. The Darrieus was invented in the 1920's and is not widely used today.

The Darrieus Turbine is also related to machines with straight vertical axis blades called Giromills or cycloturbines which use a wind vane to mechanically orient a blade pitch change mechanism. They were designed to be mounted on a tower or other device. The cylcoturbine was marketed commercially for several years, but never progressed beyond the research stage.

The Savonius Turbine is S-shaped if viewed from above. The turbine turns relatively slowly, but yields high torque. It has been proven useful for pumping water and other tasks, but its slow rotational speeds have not been proven to generate electricity cost effectively from wind power.

A concern inherent to any type of wind turbine is prevention of mechanical and/or structural failure. Another concern is safety. As wind turbines are intentionally placed in areas of high wind, they are subject to extreme environmental conditions ranging from sustained high wind events, to excessive short term gusts. Incidents of wind turbine failures, including fire, blade breakage and separation, and complete structural collapse are well known.

While the costs of construction and maintenance have always been obvious considerations as wind turbines continue to increase in size, as more turbines are placed within or closer to populated areas, issues of safety become a greater concern.

SUMMARY OF THE INVENTION

This disclosure is directed to systems and methods for using wind turbines that solve one or more of the problems discussed above. One embodiment comprises a system for automatic relief of excessive wind pressure against a wind turbine in high wind events, where the direct force of the wind is used to open a section of one or more turbine blades, allowing some or all of the wind to pass through the blade.

In one embodiment, a system of using a hook and loop material such as velcro is provided as a means to allow a section on a turbine blade to open and close (reseal) over a number of excessive or high wind events. The velcro material is attached to the turbine blades around a partial perimeter of an opening in the blade, and the complementary material is attached to an adjacent area of the blade that is configured to release or open during an excessive wind event. A remaining area that is not configured to be releasable is configured to be permanently attached, where the release panel remains attached to the turbine blade when fully opened. The size of the opening in the turbine blade, combined with the total surface area and grade or strength of the velcro material may be configured to enable the excessive wind portal to open at essentially a predetermined level of wind pressure.

In one embodiment, the turbine blades may consist of a sail type material attached to a rigid frame structure, and the section of the blade that opens under high wind may be of the same or similar material. A rigid reinforcing material such as plastic may be sewn in or otherwise attached to the perimeters to of the edges on both parts. In this embodiment, the reinforcing material allows the complementary surfaces to retain their ideal shape and position to facilitate ease of resealing after a high wind event has passed. The portal may be resealed manually, or it may be designed to automatically reseal itself. For instance, as the turbine blade rotates, gravity or wind pressure on the panel covering the portal may cause it to close. (In one alternative embodiment, the panel may be spring-loaded to assist the closing of the panel.)

In one embodiment, a wind turbine blade consists of a sail material attached to a frame that includes an inner support section along the center of the blade frame. Excessive wind portals are attached to the blade material along both sides of the center support section of the blade frame. The release panels of the excessive wind portal are configured to open along the edges that face the perimeter of the outer turbine blade frame. The release panels open towards each other and remain attached to the turbine blade parallel to each other along the center support section of the frame.

In yet another embodiment, a method for allowing a wind turbine to continue operating and producing energy in a high wind event that would normally cause the turbine to exceed at least one operating limitation is provided. The method comprises providing a plurality of excessive wind portals on each blade of the turbine, where the releasable panels are configured to open at essentially predetermined levels of wind pressure, and the size of the openings in the turbine blades are configured to reduce the overall effective surface area of the blade to a size that safely allows continued operation at incrementally higher wind speeds. The releasable panels are configured to open at different levels of wind pressure, providing a means to continue safely operating through a broader range of excessive wind events, and the entire area of the blade surface is further configured to be releasable during even higher winds that may cause the wind turbine to exceed at least one operating limitation after the after the release panels have opened.

Numerous other embodiments are also possible.

It should be noted that for clarity, the terms "excessive wind portal" or "EWP", are intended to describe, as a whole, the elements of the invention comprising an opening or portal on a wind turbine blade, a moveable portion or "release panel" that covers the opening, and the areas on both the turbine blade and release panel that are configured to both release from and stay attached to each other during a high wind event. Additional definitions may be defined throughout this disclosure.

BRIEF DESCRIPTION OF THE DRAWINGS

Other objects and advantages of the invention may become apparent upon reading the following detailed description and upon reference to the accompanying drawings.

Figure 1A:
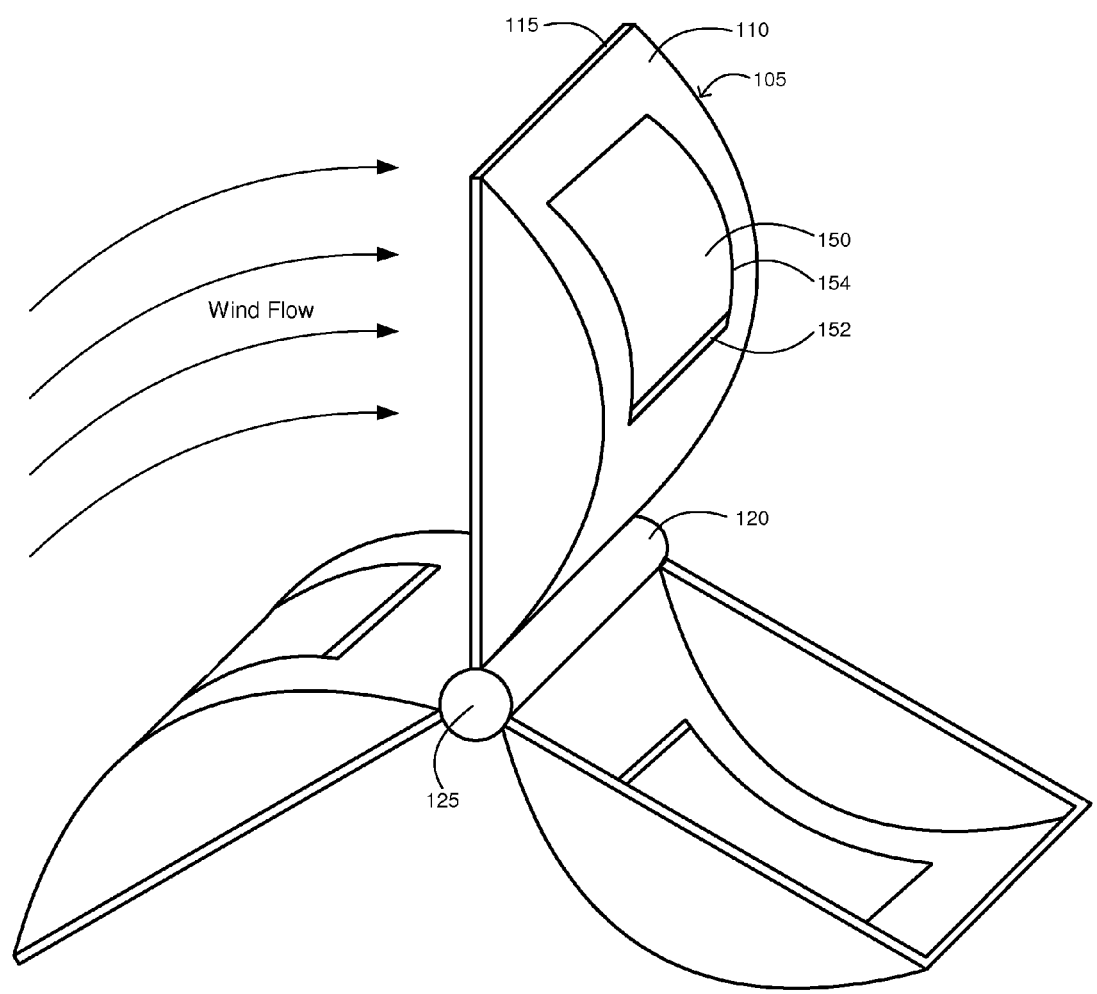
FIG. 1A is a diagram illustrating a perspective view of a horizontal axis wind turbine which includes excessive wind portals in a closed position, relative to the flow of wind.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION OF PREFERRED EMBODIMENTS

One or more embodiments of the invention are described below. It should be noted that these and any other embodiments described below are exemplary and are intended to be illustrative of the invention rather than limiting.

As described herein, various embodiments of the invention comprise systems and methods for reducing wind pressure on wind turbine blades by selectively opening excessive wind portals in the turbine blades.

Referring to FIG. 1A, a perspective view of one section of a horizontal axis wind turbine is shown. In this embodiment, the wind turbine comprises a plurality of turbine blades 105, wherein the blades further comprise a blade surface material 110, attached to a frame 115, wherein the frame is attached to an axle 120 around the wind turbines axis of rotation 125. The wind flow into the turbine is represented by the arrowhead lines coming in from the left, wherein the wind pushes the turbine in a clockwise direction in this view.

Further illustrated in FIG. 1A is the placement of an excessive wind portal 150 in a preferred embodiment, relative to the blade surface 110. At least one edge 152 of the release panel of the excessive wind portal is permanently attached to the turbine blade surface. At least one of the remaining edges 154 of the release panel are configured to be attached to blade surface in manner that will allow separation from the turbine blades in a high wind event, as will be further described in this disclosure. In one embodiment, the panel is substantially rigid and the remaining edges are held against the blade by a spring mechanism, rather than being literally attached to the blade.

Figure 1B:
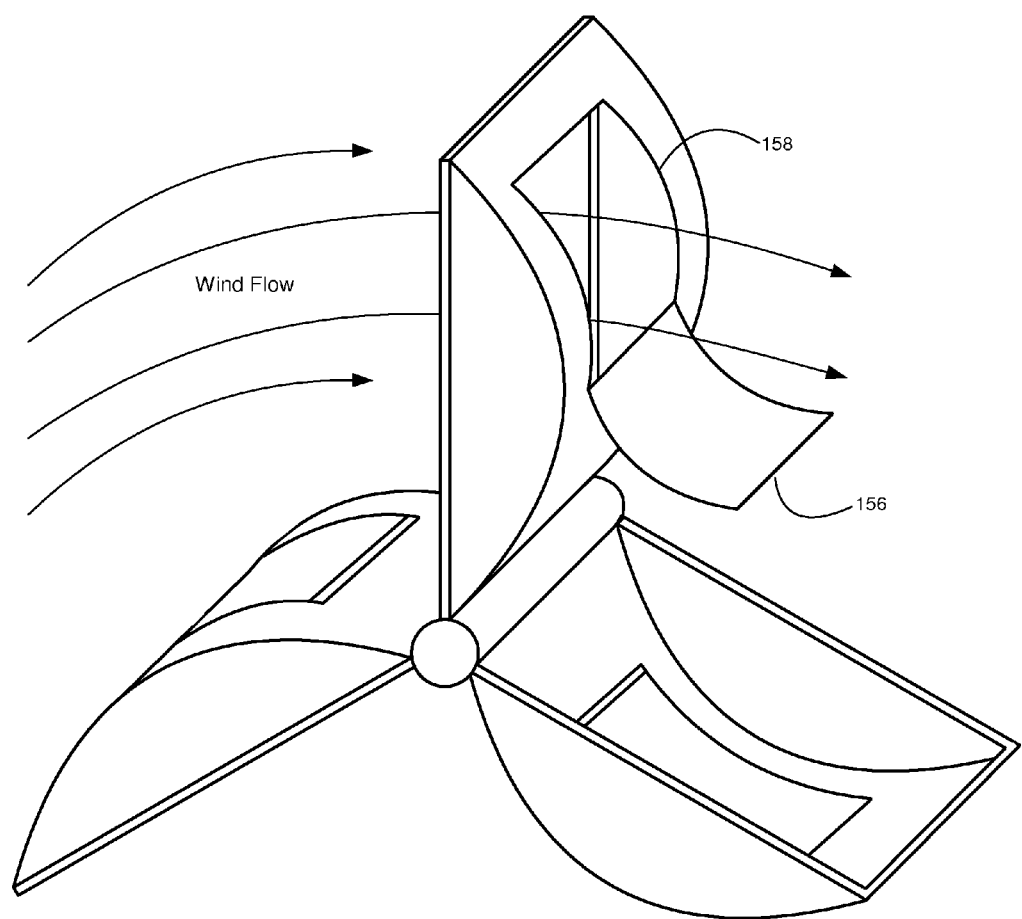
FIG. 1B is a diagram illustrating a perspective view of a horizontal axis wind turbine which further illustrates an excessive wind portal in a released position, and the resulting effect on the wind flow.

FIG. 1B is a perspective view diagram illustrating a release panel 156 of an excessive wind portal in an open position. Again, the wind flow is illustrated coming from the left, represented by the arrowhead lines, and a portion of the wind flow is additionally shown passing through the opening 158 in the wind turbine blade that is exposed when the release panel of the excessive wind portal is open. It should be noted that FIGS. 1A and 1B are provided for the purpose of illustrating a preferred embodiment of the invention, and they are intended to be exemplary rather than limiting to any specific configuration of illustrated elements.

Figure 2:
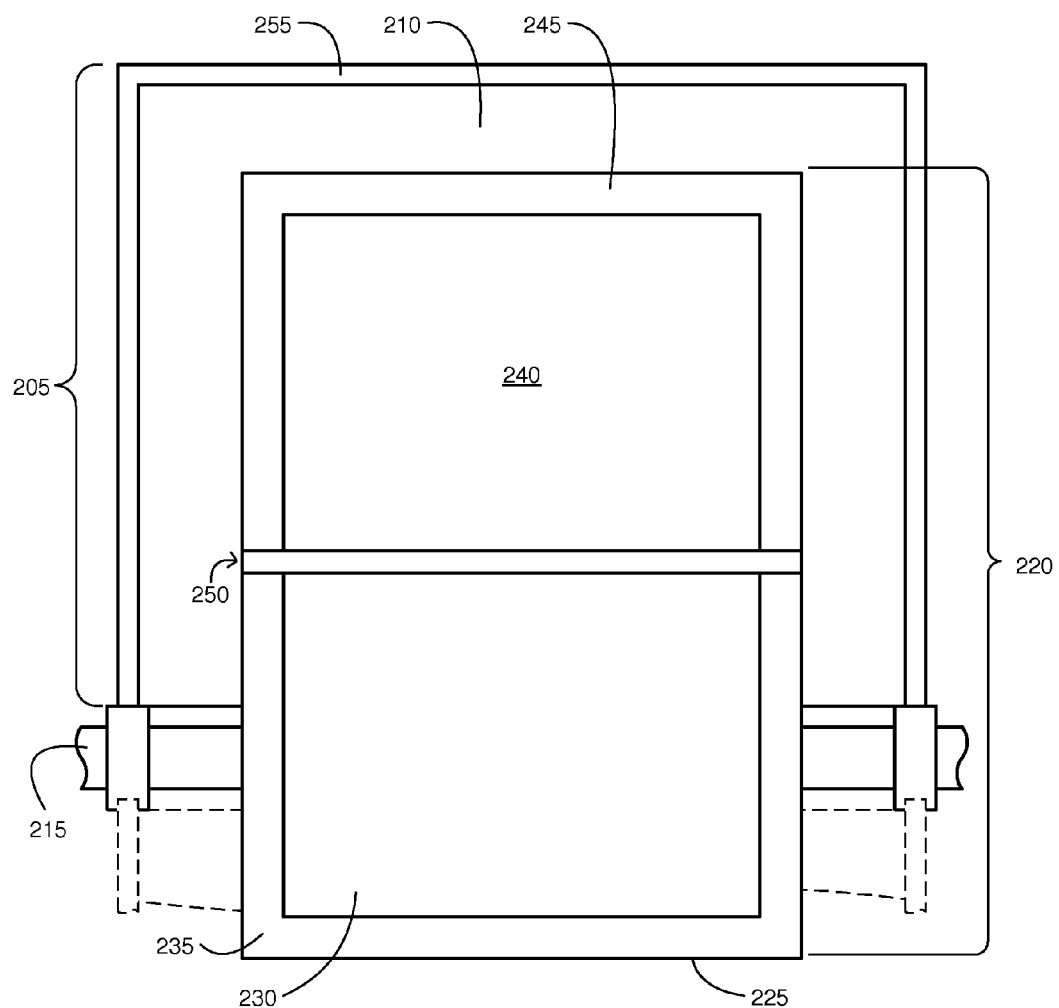
FIG. 2 is a diagram illustrating a rear view of a wind turbine blade which includes an excessive wind portal in an essentially fully open position.

Referring to FIG. 2, a diagram illustrating a wind turbine blade 205 is shown from a back view, on the side of the blade surface material 210 that faces away from the wind along the wind turbine's axis of rotation 215. The elements that comprise an excessive wind portal assembly 220 are shown, with the release panel 225 shown in an essentially fully open position in order to illustrate the individual elements of the EWP in greater detail. The area of the release panel that would face the wind in while in a closed position is shown 230. The perimeter area of the release panel where the velcro material is attached 235 is shown. While in an open position, the release panel remains attached to the turbine blade along the remaining edge of the panel 250. The air portal 240 or opening in the turbine blade that is exposed when the release panel is open is also shown. The area of the excessive wind portal where the velcro material is attached 245 to the turbine blade is also shown.

In a preferred embodiment, the turbine blade 205 comprises a sail material or similar fabric 210 attached to a frame 255, and the release panel 225 is made from the same material. The areas where the hook and loop closure material is used (235 and 245) may be reinforced with a rigid material such as plastic in order to retain their original shape through opening and closing of the release panel. The area of the release panel that is permanently attached 250 to the turbine blade may also be reinforced with a rigid material.

During normal operating conditions of the wind turbine, when the excessive wind portal is closed, a percentage of total wind pressure against the turbine blade is exerted on the release panel 230, and the release panel is held closed by the hook and loop material. The amount of the wind pressure against the release panel relative to the total amount of wind pressure is essentially proportionate to the size of the release panel, relative to the size of the entire blade surface. The level of wind pressure required to open the release panel may be varied by using different widths and/or strengths of the hook and loop material around the releasable area of the panel.

When the release panel opens, a percentage of wind pressure essentially equivalent to the size of the panel is allowed to pass through the portal 240 in the turbine blade. The advantages of the present invention should be apparent to those skilled in the art upon reading this disclosure. By using the direct pressure of the wind to actuate a release panel, the effective release of wind of pressure against the turbine blade is essentially instantaneous. This is especially advantageous in the event of sudden excessive wind gusts that may normally cause damage to a wind turbine if no excessive wind portal exists. A further benefit of the present invention is the configurable nature of the excessive wind portal, wherein the ability to vary both the wind pressure required to open the release panel, as well as the percentage of wind pressure relieved from the turbine blade, allows the excessive wind portal to be designed based on one or more operating limitations of the wind turbine, such as a predetermined rotation speed threshold, a maximum amount of torque placed on the turbine axle by the blades, or the structural limitations of the entire wind turbine.

Figure 3:
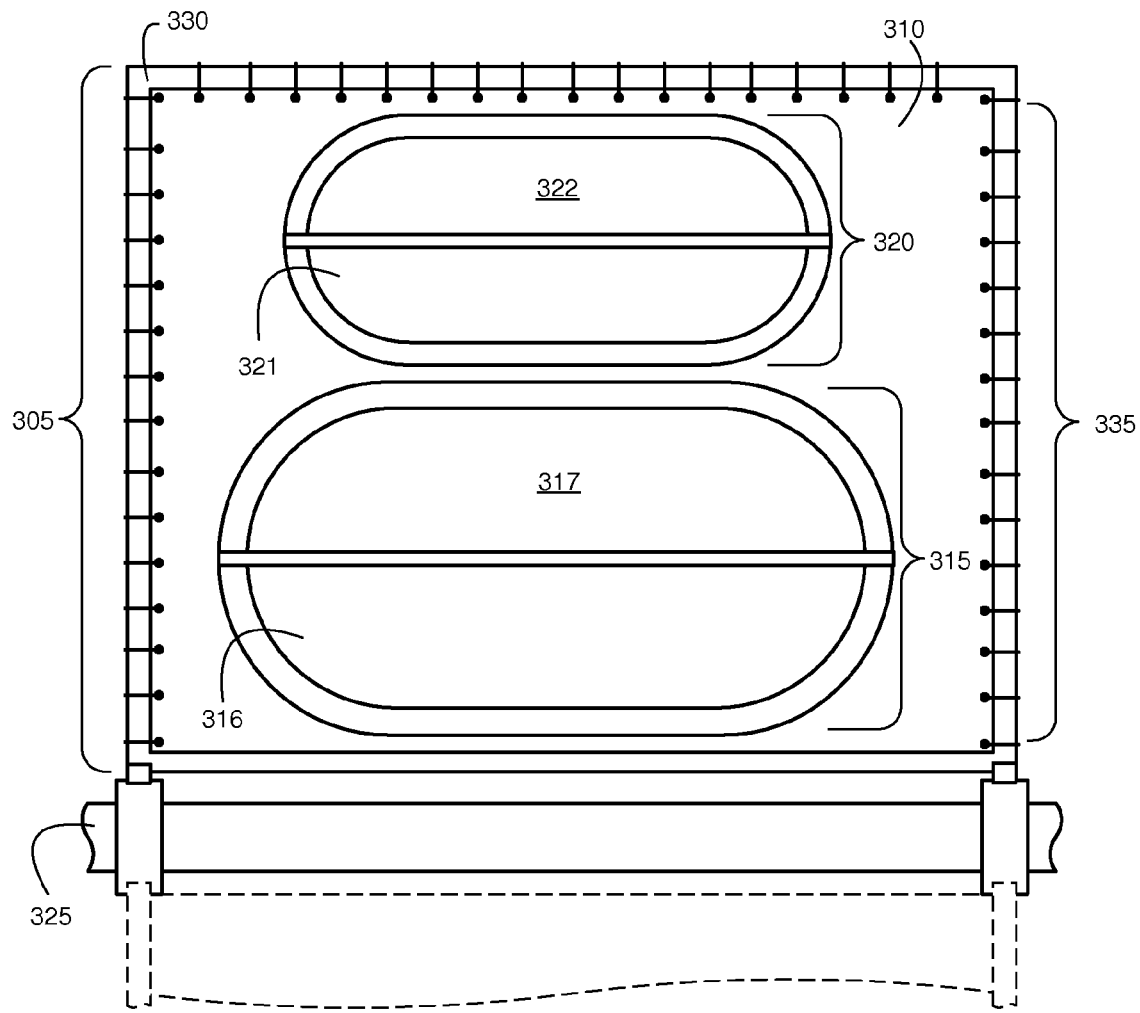
FIG. 3 is a diagram illustrating a rear view of a wind turbine blade which includes multiple excessive wind portals of varying size, shape, and position, mounted to a releasable blade.

In an advantageous embodiment, a plurality of excessive wind portals may be used on each turbine blade, and configured to release at different levels of wind pressure. Referring to FIG. 3, a blade of a wind turbine 305 is shown which includes two excessive wind portals attached to the turbine blade surface 310. A larger EWP 315 is shown in a position adjacent to a smaller EWP 320. In this embodiment EWP 320 is placed advantageously near the outer edge of the turbine blade relative to the axis of rotation 325, where higher wind pressures may occur. When the release panel 321 of EWP 320 is open, the wind is allowed to pass through the opening 322, relieving wind pressure against the turbine blade in that area. The EWP 315 is placed closer to the center of the turbine blade. When the release panel 316 of EWP 315 is open, an additional amount of wind is allowed to pass through the opening 317.

By using multiple excessive wind portals of varying configuration, a greater range of safe operation is achieved by allowing the wind pressure against the turbine blades to release in essentially predetermined increments. Additionally, the turbine blade surface material 310 may be configured to release from the frame 330 around the outer perimeter of the frame at an even higher wind pressure, wherein the blade material is attached to the frame using a method such as zip ties 335 or a hook and loop material, allowing for an even greater degree of safety.

Figure 4A:
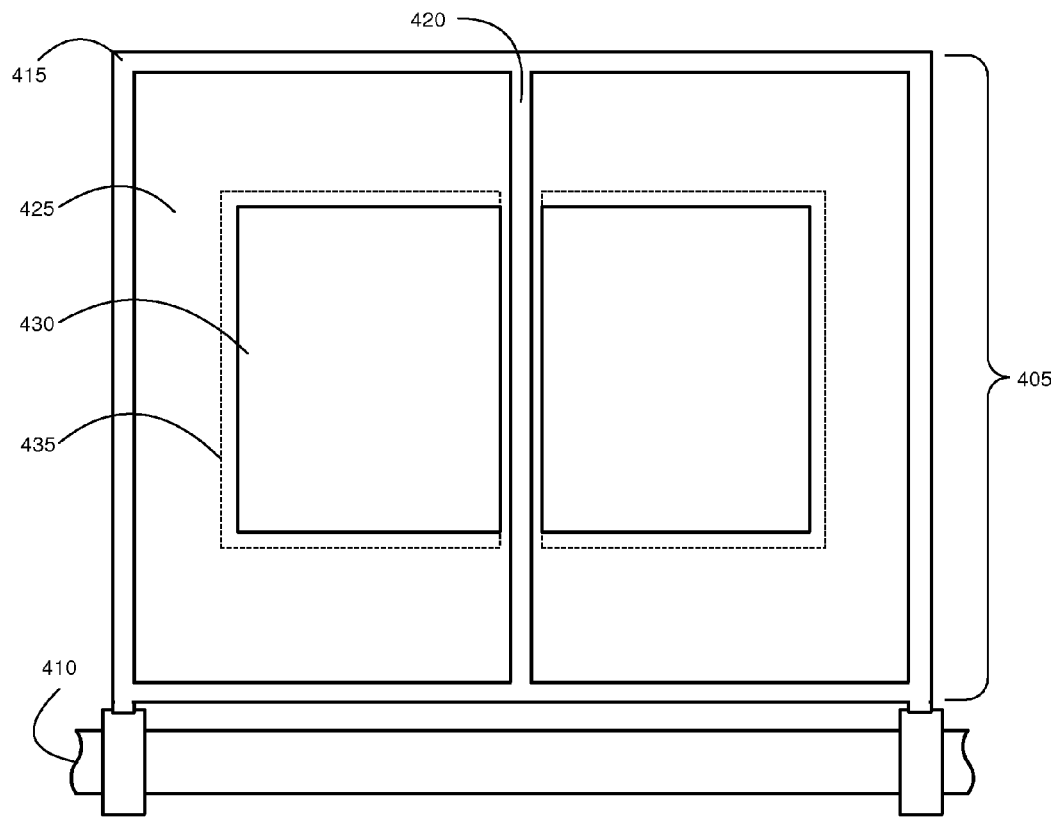
FIG. 4A is a diagram illustrating a front view of a wind turbine blade that includes a frame with a central support section with two excessive wind portals mounted on opposing sides of the central support area of the frame.
Figure 4B:
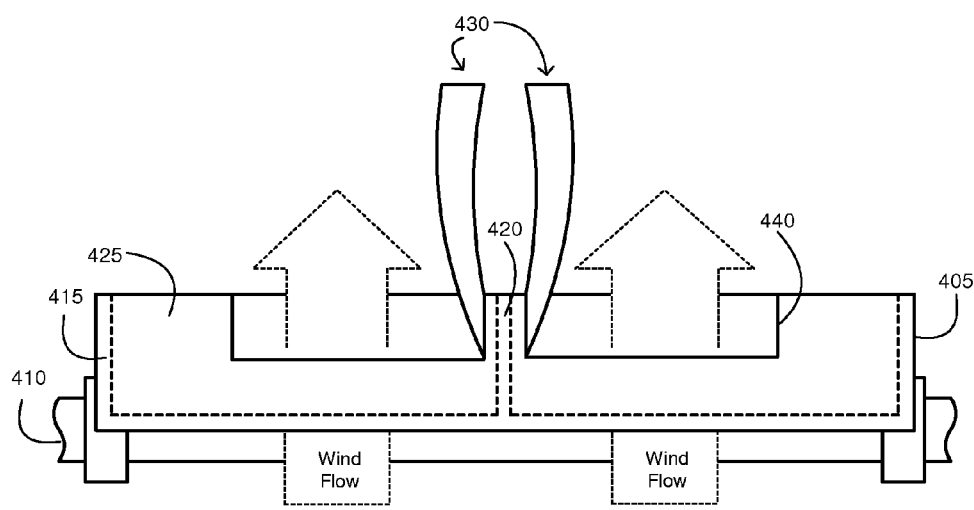
FIG. 4B is a diagram illustrating a top view of a wind turbine blade that includes two excessive wind portals with the release panels shown in a open position, and further illustrates the area of wind flow through the turbine blade.

In an advantageous embodiment, a turbine blade frame with an additional support section along the center is provided, with excessive wind portals included on both sides of the center frame support. Referring to FIG. 4A, a turbine blade 405 is shown from a front view or the surface of the blade facing the wind around the wind turbine's axis of rotation 410. A turbine blade frame 415 is shown which includes a center section 420 to provide additional support for the blade material 425. Two excessive wind portals 430 are shown on opposite sides of the center frame support 420 in a closed position. The perimeter of the release panels configured with a hook and loop material which cannot be seen in the wind facing view are represented by the dotted lines 435 around the edges. Referring to FIG. 4B, the turbine blade 405 is shown from a top view, above its axis of rotation 410, with the release panels 430 of the excessive wind portals shown in an open position. The turbine blade frame 415 which is not visible in this view is represented by the dotted lines inside the turbine blade surface material 425. When the release panels 430 are open, the wind flows through the air portals 440 on both sides of the center frame support 420.

It should be noted that the embodiments described above are illustrative, and many variations of the described features are possible. For instance, The release panel material can be flexible (e.g., fabric), or it can be rigid or semi-rigid (e.g., poly, fiber/composite, etc.). Likewise, the turbine blades can be constructed using fabric or other flexible materials, rigid or semi-rigid materials, or a mix of different materials. The turbine blades, portals, release panels and other components may have various shapes, sizes, numbers, positions, and so on. The panels may be releasably attached to the turbine blades using hook-and-loop material, mechanical latches or releasable fasteners, or other means to hold them in position on the turbine blades. Many other variations are also possible.

In this embodiment, the present invention benefits from the additional rigid support provided by the section of the turbine blade frame in proximity to the non-releasable areas of the excessive wind portal release panels. A further benefit of this embodiment is that in opening the release panels inward towards each other, perpendicular to the axis of rotation of the wind turbine, the release panels remain positioned away from the wind turbine axle.

The various embodiments of the invention may provide a number of advantages over existing systems. For instance, the excessive wind portals may prevent damage to the wind turbine that might otherwise be caused by high winds. Further, the excessive wind portals are actuated by the direct force of the wind, so costly control systems are not required, and actuation is virtually instantaneous. The excessive wind portals are simple, maintenance free, and configurable to any desired size, shape, or wind threshold.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A wind turbine system comprising:
    a plurality of turbine blades; and
    a hub, wherein each of the turbine blades is attached to the hub and wherein the hub and turbine blades are configured to rotate when wind pressure is applied to one or more of the turbine blades;
    wherein each turbine blade has at least one excessive wind portal therethrough, and a panel which is configured to be positioned alternatively in an open position or a closed position, wherein the panel opens toward a direction in which the turbine blade is rotating and closes away from the direction in which the turbine blade is rotating, wherein when the panel is in the closed position, the panel covers the excessive wind portal, thereby preventing wind from passing through the excessive wind portal, and wherein when the panel is in the open position, wind is allowed to pass through the excessive wind portal, wherein a force with which the wind pressure rotates the wind turbine is less when the panel is open than when the panel is closed;
    wherein each panel is configured to move to the open position in response to application of at least a first threshold amount of wind pressure to the panel;
    wherein each turbine blade comprises fabric attached to a rigid frame, wherein each panel comprises fabric, and wherein a first edge of the panel is permanently attached to the turbine blade, and wherein the remaining edges of the panel are releasably attached to the turbine blade; and wherein the fabric of the turbine blade is configured to release from the rigid frame upon application of a second threshold amount of wind pressure to the turbine blade, wherein the second threshold amount of wind pressure is greater than the first threshold amount of wind pressure.

2. The system of claim 1, wherein each turbine blade has a plurality of excessive wind portals therethrough, each excessive wind portal having a corresponding panel which is configured to be positioned alternatively in an open position or a closed position.

3. The system of claim 1, wherein the edges of the panel that are releasably attached to the turbine blade and corresponding edges of the excessive wind portal comprise hook-and-loop material which releasably attaches the panel to the turbine blade.

4. The system of claim 1, wherein the panel is reinforced to retain substantially the same shape when in both the open and closed positions.

5. An improvement to a wind turbine having at least one turbine blade, wherein wind pressure on the turbine blade causes the wind turbine to rotate, the improvement comprising:
 an excessive wind portal through the turbine blade; and
 a panel configured to be positioned alternatively in an open position or a closed position, wherein the panel opens toward a direction in which the turbine blade is rotating and closes away from the direction in which the turbine blade is rotating;
 wherein when the panel is in the closed position, the panel covers the excessive wind portal, thereby preventing wind from passing through the excessive wind portal and providing a first amount of wind pressure on the turbine blade; and
 wherein when the panel is in the open position, wind is allowed to pass through the excessive wind portal, thereby providing a second amount of wind pressure on the turbine blade which is less than the first amount of wind pressure;
 wherein each panel is configured to move to the open position in response to application of at least a first threshold amount of wind pressure to the panel;
 wherein each turbine blade comprises fabric attached to a rigid frame, wherein each panel comprises fabric, and wherein a first edge of the panel is permanently attached to the turbine blade, and wherein the remaining edges of the panel are releasably attached to the turbine blade; and
 wherein the fabric of the turbine blade is configured to release from the rigid frame upon application of a second threshold amount of wind pressure to the turbine blade, wherein the second threshold amount of wind pressure is greater than the first threshold amount of wind pressure.

6. The improvement of claim 5, wherein the edges of the panel that are releasably attached to the turbine blade and corresponding edges of the excessive wind portal comprise hook-and-loop material which releasably attaches the panel to the turbine blade.

7. The improvement of claim 5, wherein the panel is reinforced to retain substantially the same shape when in both the open and closed positions.

\* \* \* \* \*